United States Patent
Cloutier (10) Patent No.: US 11,859,561 B2
(45) Date of Patent: Jan. 2, 2024

(54) METHOD AND SYSTEM FOR DETERMINING AIRCRAFT ENGINE INLET TOTAL PRESSURE

(71) Applicant: PRATT & WHITNEY CANADA CORP., Longueuil (CA)

(72) Inventor: Yves Cloutier, St-Bruno-de-Montarville (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 46 days.

(21) Appl. No.: 17/643,072

(22) Filed: Dec. 7, 2021

(65) Prior Publication Data

US 2023/0175442 A1  Jun. 8, 2023

(51) Int. Cl.
F02C 9/00  (2006.01)

(52) U.S. Cl.
CPC .......... *F02C 9/00* (2013.01); *F05D 2220/323* (2013.01); *F05D 2270/3011* (2013.01)

(58) Field of Classification Search
None
See application file for complete search history.

(56) References Cited

U.S. PATENT DOCUMENTS

| 4,050,306 A | 9/1977 | Khalid |
| 4,248,042 A * | 2/1981 | Larsen ............... F02C 9/28 |
| | | 701/100 |
| 4,433,584 A | 2/1984 | Kokoszka et al. |
| 4,765,751 A | 8/1988 | Pannone et al. |
| 5,394,689 A * | 3/1995 | D'Onofrio ............... F02C 9/28 |
| | | 60/204 |
| 8,720,258 B2 * | 5/2014 | Meisner ............. G05B 23/0254 |
| | | 73/112.01 |

(Continued)

FOREIGN PATENT DOCUMENTS

| CN | 112665861 | 4/2021 |
| CN | 113449475 | 9/2021 |

(Continued)

OTHER PUBLICATIONS

European Search Report issued in counterpart application 22211920.8 dated May 8, 2023.

*Primary Examiner* — Todd E Manahan
*Assistant Examiner* — David P. Olynick
(74) *Attorney, Agent, or Firm* — NORTON ROSE FULBRIGHT CANADA LLP.

(57) ABSTRACT

A method of determining an inlet total air pressure includes determining a first parameter indicative of a first inlet total air pressure. The method includes executing a sequence that includes: determining a mass air flow passing through the air inlet based on the first parameter, determining a Mach number of air passing through the air inlet based on the mass air flow, determining a static air pressure at the air inlet, determining an air pressure ratio based on the Mach number, generating a subsequent parameter indicative of the revised inlet total air pressure based on the air pressure ratio and the static air pressure, and substituting the subsequent parameter for the first parameter. The method includes executing at least one additional instance of the sequence with the subsequent parameter, and outputting the subsequent parameter as the inlet total air pressure.

15 Claims, 7 Drawing Sheets

(56) References Cited

U.S. PATENT DOCUMENTS

| | | | |
|---|---|---|---|
| 9,970,316 B2 | 5/2018 | Radeljak et al. | |
| 2011/0208400 A1 | 8/2011 | Lickfold et al. | |
| 2015/0330310 A1 | 11/2015 | Degaribody | |
| 2020/0248622 A1* | 8/2020 | Crowley | F02C 7/057 |

FOREIGN PATENT DOCUMENTS

| | | |
|---|---|---|
| GB | 2252131 | 7/1992 |
| GB | 2355046 A | 4/2001 |

* cited by examiner

FIG. 5

METHOD AND SYSTEM FOR DETERMINING AIRCRAFT ENGINE INLET TOTAL PRESSURE

CROSS-REFERENCE TO RELATED APPLICATIONS

Reference is made to U.S. patent application Ser. No. 17/453,387 filed Nov. 3, 2021, the entire contents of which are incorporated by reference herein.

TECHNICAL FIELD

The application relates generally to aircraft engines and, more particularly, to air inlets for aircraft engines.

BACKGROUND

It is sometimes desirable to know the pressure at different locations of an aircraft engine, such as at or near the inlet of a compressor of the aircraft engine. A technique for determining this pressure uses ambient atmospheric pressure or an aircraft total pressure (pitot). However, this technique may not capture the effect on the pressure at the inlet of the compressor caused by various operational or installation effects such as losses due to icing, variations in angle of attack, inlet by-pass flow, inertial particle separators, inlet barrier filters, and/or the left/right/center installation of the aircraft engine on the aircraft.

SUMMARY

There is disclosed a method of determining an inlet total air pressure of air at an air inlet of an aircraft engine, the method comprising: determining, at a computing device, a first parameter indicative of a first inlet total air pressure at the air inlet; executing, at the computing device, a sequence that includes: determining, at the computing device, a mass air flow passing through the air inlet based on the first parameter; determining, at the computing device, a Mach number of air passing through the air inlet based on the mass air flow; determining, at the computing device, a static air pressure at the air inlet; determining, at the computing device, an air pressure ratio based on the Mach number, the air pressure ratio defined as a revised inlet total air pressure over an estimated static air pressure at the air inlet; generating, at the computing device, a subsequent parameter indicative of the revised inlet total air pressure based on the air pressure ratio and the static air pressure; and substituting, at the computing device, the subsequent parameter for the first parameter; executing, at the computing device, at least one additional instance of the sequence with the subsequent parameter; and outputting, at the computing device, the subsequent parameter as the inlet total air pressure.

There is disclosed a system for determining an inlet total air pressure of air at an air inlet of an aircraft engine, the system comprising: a static pressure sensor disposed at the air inlet and configured to measure a static air pressure at the air inlet; a processing unit; and a non-transitory computer-readable memory communicatively coupled to the processing unit and comprising computer-readable program instructions executable by the processing unit for: determining a first parameter indicative of a first inlet total air pressure at the air inlet; executing a sequence that includes: determining a mass air flow passing through the air inlet based on the first parameter; determining a Mach number of air passing through the air inlet based on the mass air flow; receiving the static air pressure from the static pressure sensor; determining an air pressure ratio based on the Mach number, the air pressure ratio defined as a revised inlet total air pressure over an estimated static air pressure at the air inlet; generating a subsequent parameter indicative of the revised inlet total air pressure based on the air pressure ratio and the static air pressure; and substituting the subsequent parameter for the first parameter; executing at least one additional instance of the sequence with the subsequent parameter; and outputting the subsequent parameter as the inlet total air pressure.

DESCRIPTION OF THE DRAWINGS

Reference is now made to the accompanying figures in which:

FIG. 3 is block diagram of an example system for determining an inlet total pressure;

DETAILED DESCRIPTION

Figure 1A:
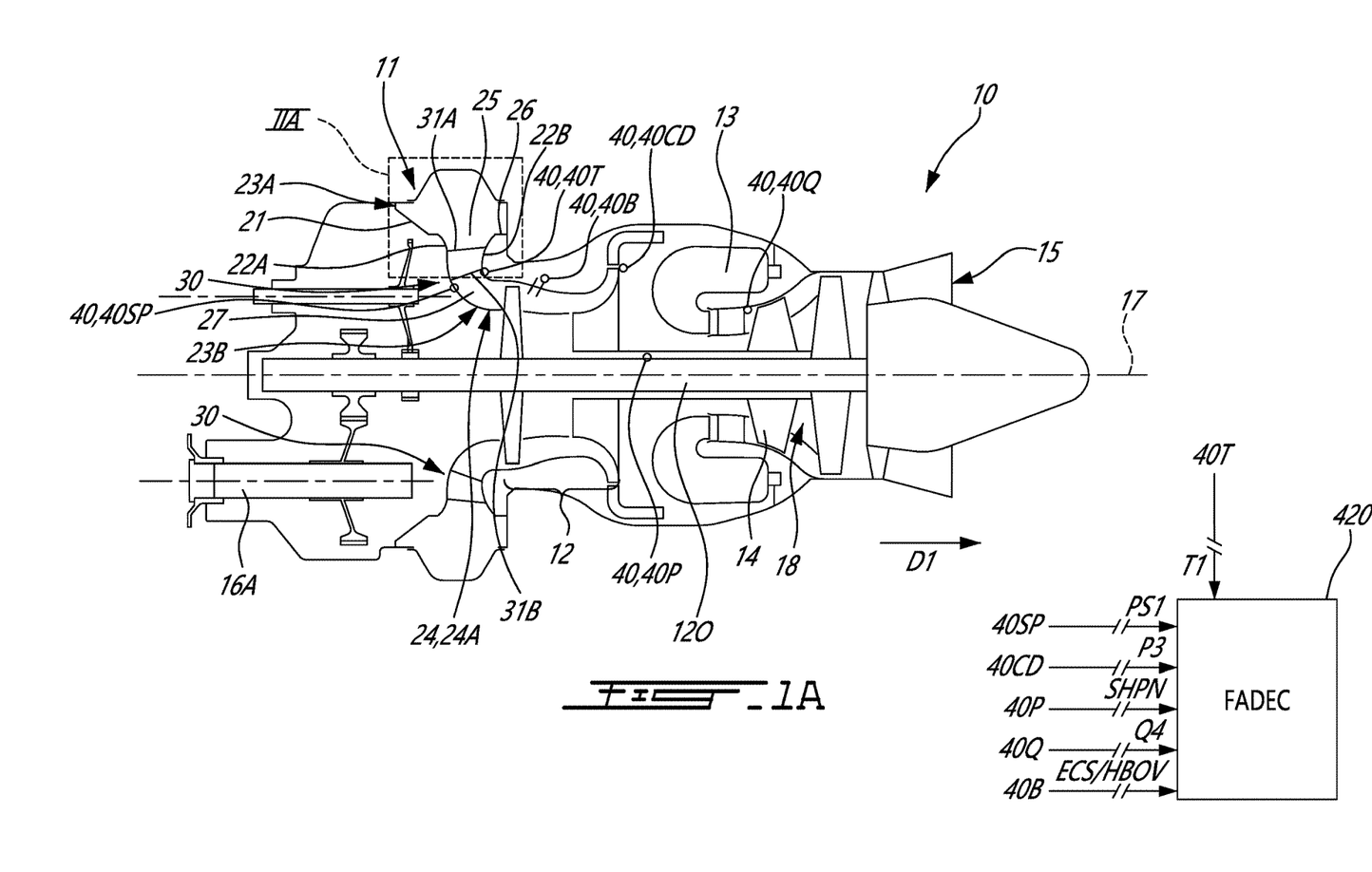
FIG. 1A is a schematic cross sectional view of a gas turbine engine.
Figure 1B:
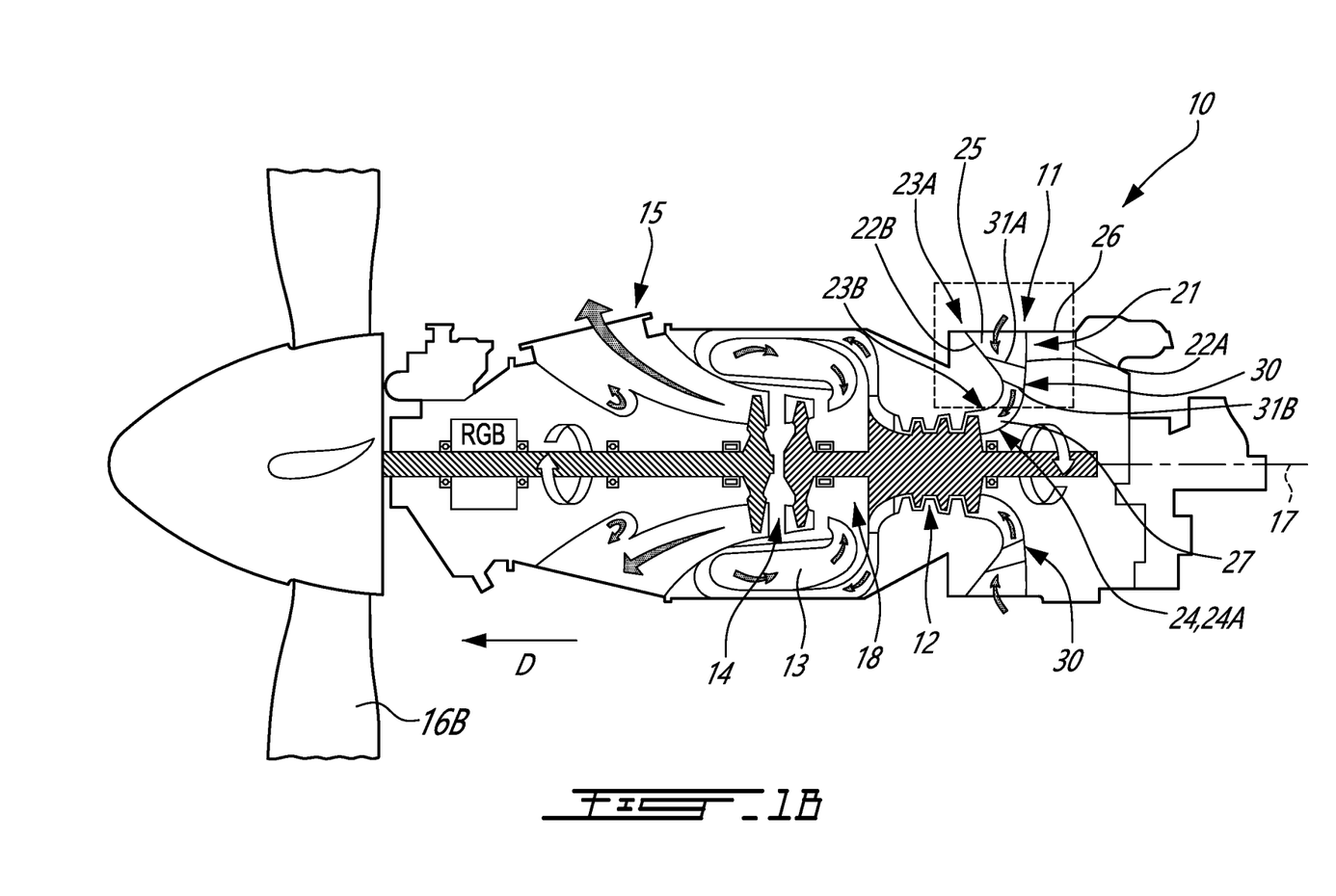
FIG. 1B is a schematic cross sectional view of another gas turbine engine.
Figure 1C:
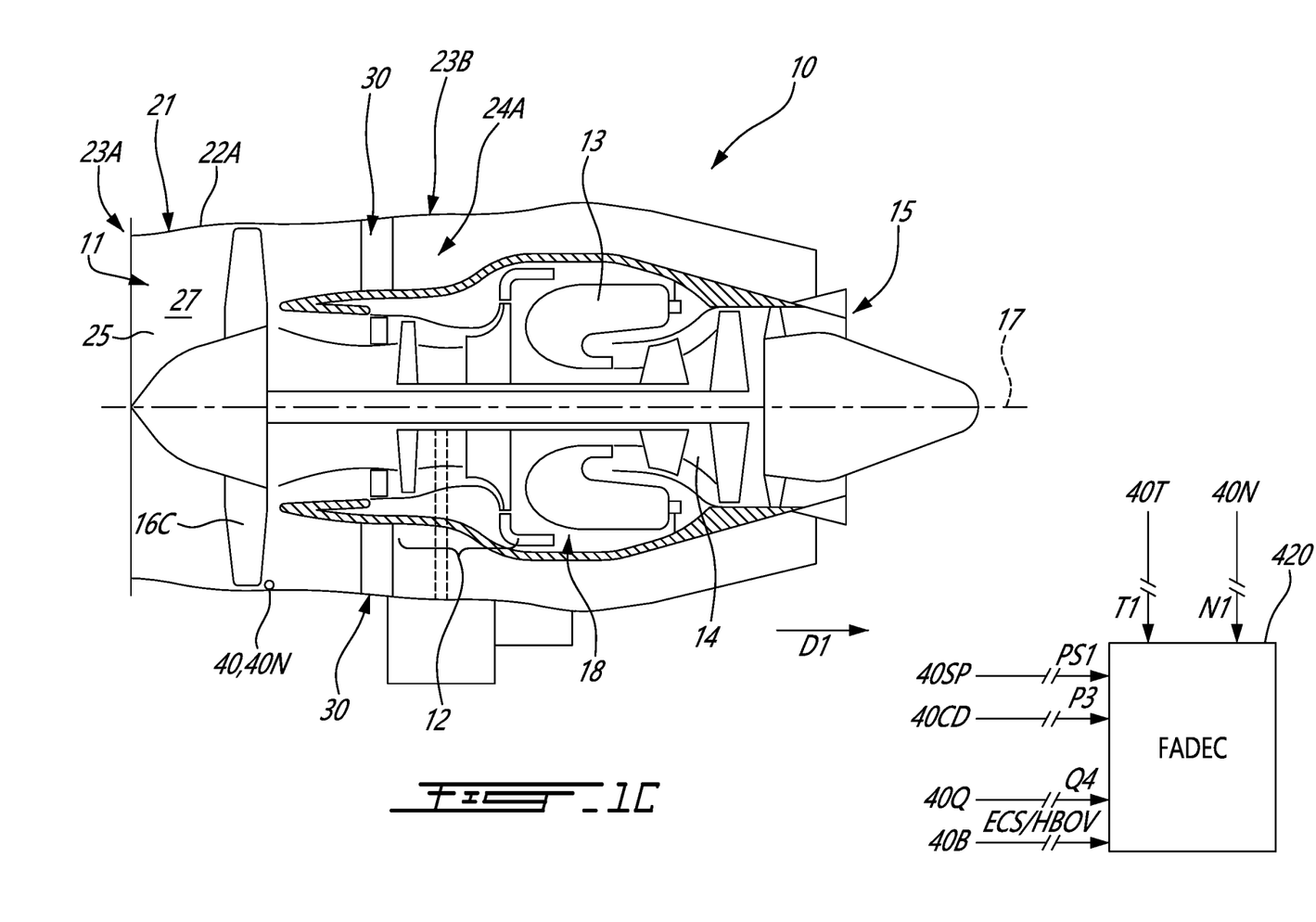
FIG. 1C is a schematic cross sectional view of another gas turbine engine.

FIGS. 1A to 1C illustrate different aircraft engines 10 of a type preferably provided for use in subsonic flight. Each of the aircraft engines 10 is a gas turbine engine 10. The gas turbine engines 10 generally comprises in serial flow communication an air inlet 11, a compressor section 12 for pressurizing the air from the air inlet 11, a combustor 13 in which the compressed air is mixed with fuel and ignited for generating an annular stream of hot combustion gases, a turbine section 14 for extracting energy from the combustion gases, and an exhaust outlet 15 through which the combustion gases exit the gas turbine engine 10. The gas turbine engine 10 have a longitudinal center axis 17 about which components rotate. In the gas turbine engines 10 shown in FIGS. 1A and 1C, the air inlet 11 is positioned forward of the compressor section 12, whereas in the gas turbine engine 10 shown in FIG. 1B, the air inlet 11 is positioned aft of the compressor section 12. The gas turbine engine 10 of FIG. 1A includes a driven gear train 16A mounted at a front end of the gas turbine engine 10, and is an example of a "turboshaft" gas turbine engine 10. The gas turbine engine 10 of FIG. 1B includes a propeller 16B which provides thrust for flight and taxiing, and is an example of a "turboprop" gas turbine engine 10. The gas turbine engine 10 of FIG. 1C includes a fan 16C which rotates about a fan axis (in FIG. 1C, collinear with the center axis 17) and which provides thrust for flight, and is an example of a "turbofan" gas turbine engine 10.

The gas turbine engines 10 (sometimes referred to herein simply as "engines 10") have a central core 18 through which gases flow and which includes some of the turbomachinery of the engine 10. The engine 10 of FIG. 1B is a "reverse-flow" engine 10 because gases flow through the core 18 from the air inlet 11 at a rear portion, to the exhaust outlet 15 at a front portion. This is in contrast to "through-flow" gas turbine engines 10, such as those shown in FIGS.

1A and 1C, in which gases flow through the core 18 of the engine 10 from a front portion to a rear portion. The direction of the flow of gases through the core 18 of the engine 10 of FIG. 1B can be better appreciated by considering that the gases flow through the core 18 in the same direction D as the one along which the engine 10 travels during flight for the engine. Stated differently, gases flow through the engine 10 of FIG. 1B from a rear end towards a front end in the direction of the propeller 16B. The direction of the flow of gases through the core 18 of the engines 10 of FIGS. 1A and 1C can be better appreciated by considering that the gases flow through the core 18 in a direction D1 that is opposite to the direction one along which the engines 10 travel during flight for the engines. Stated differently, gases flow through the engines 10 of FIGS. 1A and 1C from a front end towards a rear end in the direction of the exhaust outlet 15. The engines 10 of FIGS. 1A to 1C may have one or multiple spools which perform compression to pressurize the air received through the air inlet 11, and which extract energy from the combustion gases before they exit the core 18 via the exhaust outlet 15. The spools and this engine architecture are described in greater detail in U.S. patent application Ser. No. 15/266,321 filed on Sep. 15, 2016, the entire contents of which are hereby incorporated by reference.

It will thus be appreciated that the expressions "forward" and "aft" used herein refer to the relative disposition of components of the engines 10, in correspondence to the "forward" and "aft" directions of the engines 10 and aircraft including the engines 10 as defined with respect to the direction of travel. In FIGS. 1A and 1C, a component of the engines 10 that is "forward" of another component is arranged within the engine 10 such that it is located closer to the air inlet 11. Similarly, a component of the engines 10 in FIGS. 1A and 1C that is "aft" of another component is arranged within the engines 10 such that it is further away from the air inlet 11. In FIG. 1B, a component of the engine 10 that is "forward" of another component is arranged within the engine 10 such that it is located closer to the propeller 16B.

Referring to FIGS. 1A to 1C, the air inlet 11 is the first point of entry for air into the core 18 of the engine 10. The air inlet 11 has, or is defined by, an inlet duct 21 along which air flows as it drawn into the engine 10. The inlet duct 21 may take different forms, as described in greater detail below.

Referring to FIGS. 1A and 1B, the air inlet 11 is a radial air inlet 11 because, during operation of the engines 10, air is drawn into the engine via the air inlet 11 along a substantially radial direction relative to the center axis 17. The inlet duct 21 is defined by two annular walls 22A,22B with sections that extend along substantially radial directions relative to the center axis 17. Each wall 22A,22B is shown as being an integral body. In an alternate embodiment, one or both of the walls 22A,22B is made up of wall segments. Each annular wall 22A,22B extends between a radially-outer portion 23A and a radially-inner portion 23B. The radially-inner portion 23B is a portion of each wall 22A,22B that is radially inward (i.e. closer to the center axis 17 of the engine 10) than the radially-outer portion 23A. Each wall 22A,22B therefore extends from an outer surface or portion of the engine 10 radially inwards toward the core 18. The walls 22A,22B in the depicted embodiment also have portions extending in an axial direction relative to the center axis 17. The radially-inner portions 23B of each wall 22A,22B have trailing ends 24 which, in the frame of reference of the engine 10, are defined by both axial and radial direction vectors. An air opening or inlet 25 is defined at the radially-outer portions 23A of the walls 22A,22B. The inlet 25 is circumferential because it spans a portion or all of the circumference of the inlet duct 21. The inlet 25 extends through an outermost surface 26 of the engine 10. The outermost surface 26 may be defined by an engine covering, such as a nacelle or casing. The inlet 25 may be provided with a screen, filter, or mesh to prevent the ingress of foreign objects into the engine 10. The inlet duct 21 extends from the inlet 25 in a radially-inward direction to an outlet 24A of the inlet duct 21 which is defined by the radially-inner portions 23B of each wall 22A,22B. The outlet 24A is within the engines 10 and forms part of their cores 18.

Referring to FIGS. 1A and 1B, the walls 22A,22B are axially spaced apart from one another. In FIG. 1A, the wall 22B is aft of the wall 22A in a direction along the center axis 17. In FIG. 1B, the wall 22B is forward of the wall 22A in a direction along the center axis 17. The axial offset between the annular walls 22A,22B defines an inner volume of the inlet duct 21 through which air is conveyed toward the compressor section 12. The spaced-apart walls 22A,22B therefore define an annular air passage 27 between them. The air passage 27 is an annular volume that extends radially inwardly at the radially-outer portions 23A and which has both axial and radial direction vectors at the radially-inner portion 23B of the walls 22A,22B.

Referring to FIG. 1C, the air inlet 11 is an axial air inlet 11 because, during operation of the engine 10, air is drawn into the engine via the air inlet 11 along a substantially axial direction relative to the center axis 17. The inlet duct 21 is defined by an annular wall 22A that extends along substantially an axial direction relative to the center axis 17. The wall 22A is shown as being an integral body. In an alternate embodiment, the wall 22A is made up of wall segments. The annular wall 22A extends between an axially-outer portion 23A and an axially-inner portion 23B. The axially-inner portion 23B is a portion of the wall 22A that is axially inward (i.e. closer to the compressor section 12 the engine 10) than the axially-outer portion 23A. The wall 22A therefore extends from an outer surface or portion of the engine 10 axially inwards toward the core 18. An inlet 25 is defined at the axially-outer portion 23A of the wall 22A. The inlet 25 is circumferential because it spans a portion or all of the circumference of the inlet duct 21. The wall 22A defines an annular air passage 27. The air passage 27 is an annular volume that extends axially inwardly at the axially-outer portions 23A. The inlet duct 21 extends from the inlet 25 in an axially-inward direction to an outlet 24A of the inlet duct 21 which is defined by the axially-inner portion 23B of the wall 22A. The outlet 24A is within the engine 10 and forms part of the core 18.

The air inlets 11 of the engines 10 of FIGS. 1A to 1C include structural supports, or struts 30. The struts 30 may take different forms.

Referring to the radial air inlets 11 of FIGS. 1A and 1B, multiple air inlet struts 30 are located within the inlet duct 21. Each strut 30 is part of the fixed structure of the engine 10. Each strut 30 is a stationary component that helps to provide structure to the air inlet 11. The struts 30 are circumferentially spaced-apart from one another about the center axis 17 within the inlet duct 21. Each strut 30 extends across the inlet duct 21 between the annular walls 22A,22B and through the annular air passage 27. Each strut 30 is attached to the annular walls 22A,22B. In the depicted embodiment, each strut 30 is integral with the walls 22A, 22B. In an alternate embodiment, one or more of the struts 30 can be removably mounted to the walls 22A,22B. Each of the struts 30 in the depicted embodiment is a radial air inlet strut 30 because it extends radially inwardly. Stated differently, each strut 30 has a radial span defined between a radially-outer edge which defines the leading edge 31A of the strut 30 near the radially-outer portions 23A of the walls 22A,22B, and a radially-inner edge which defines the trailing edge 31B near the radially-inner portions 23B of the walls 22A,22B. Some or all of the trailing edge 31B is radially closer to the center axis 17 than the leading edge 31A. The position of the edges 31A,31B of the strut 30 relative to the engine 10 may vary, and what remains constant is that the trailing edge 31B is downstream of the leading edge 31A relative to the flow of air over the strut 30. Referring to FIGS. 1A and 1B, each strut 30 also has an axial span defined between the annular walls 22A,22B of the inlet duct 21.

Referring to FIGS. 1A and 1B, one or more of the struts 30 is shaped like an airfoil. The airfoil shape of the strut 30 helps to guide the flow of air through the air inlet 11. Each airfoil-shaped strut 30 includes the leading edge 31A, and the trailing edge 31B. The trailing edge 31B is radially closer to the center axis 17 than the leading edge 31A along some or all of its length. The strut 30 may be positioned radially inwardly of the inlet 25 and radially outwardly of the outlet 24A. The strut 30 is positioned downstream of the inlet 25 and upstream of the outlet 24A, relative to the direction of flow across the strut 30 from the leading edge 31A to the trailing edge 31B. In an embodiment, the strut 30 is positioned at or adjacent to the inlet 25. The chord C of the strut 30 is therefore defined along a line extending between the leading and trailing edges 31A,31B (see FIG. 2). The chord C therefore extends in a substantially radial direction. By "substantially radial", it is understood that in the frame of reference of the engine 10, the magnitude of the radial direction vector of the chord C may be much greater than the magnitude of the axial direction vector of the chord C. The chord C may have a camber or stagger angle. In alternate embodiments, one or more of the struts 30 do not have an airfoil shape.

Referring to FIG. 1A, the gas turbine engine 10 is instrumented to provide data for different components of the engine 10. The engine 10 is equipped with sensors 40, which may measure pressure, temperature, speed, angular velocity, torque, power, vibration, and the like. Non-limiting examples of possible sensors 40 for the engine 10 are now described in greater detail with reference to the gas turbine engine 10 of FIG. 1A, it being understood that the gas turbine engines of FIGS. 1B and 1C may also be equipped with these sensors 40, in addition to or separately from, different sensors 40.

Referring to FIG. 1A, the engine 10 has a static pressure sensor 40SP. The static pressure sensor 40SP may take any configuration (e.g. a tap, a probe, etc.) which is capable of measuring or recording the static pressure of the air at the air inlet 11, sometimes referred to herein as the "PS1" pressure, where the number "1" is used to designate the position of the air inlet 11. The static pressure is the pressure applied by the air at the location of the static pressure sensor 40SP when the air has substantially zero local velocity relative to the static pressure sensor 40SP. In an embodiment, the static pressure sensor 40SP excludes, prevents, or reduces the measurement of any dynamic pressure component of the air at the location of the static pressure sensor 40SP, where the dynamic pressure is the pressure applied by the air as a result of its motion relative to the static pressure sensor 40SP. In an embodiment, the static pressure sensor 40SP contributes to the measurement of a total or ram pressure component of the air at the location of the static pressure sensor 40SP, where the total pressure is the addition of static pressure and dynamic pressure at the static pressure sensor 40SP.

Figure 2:
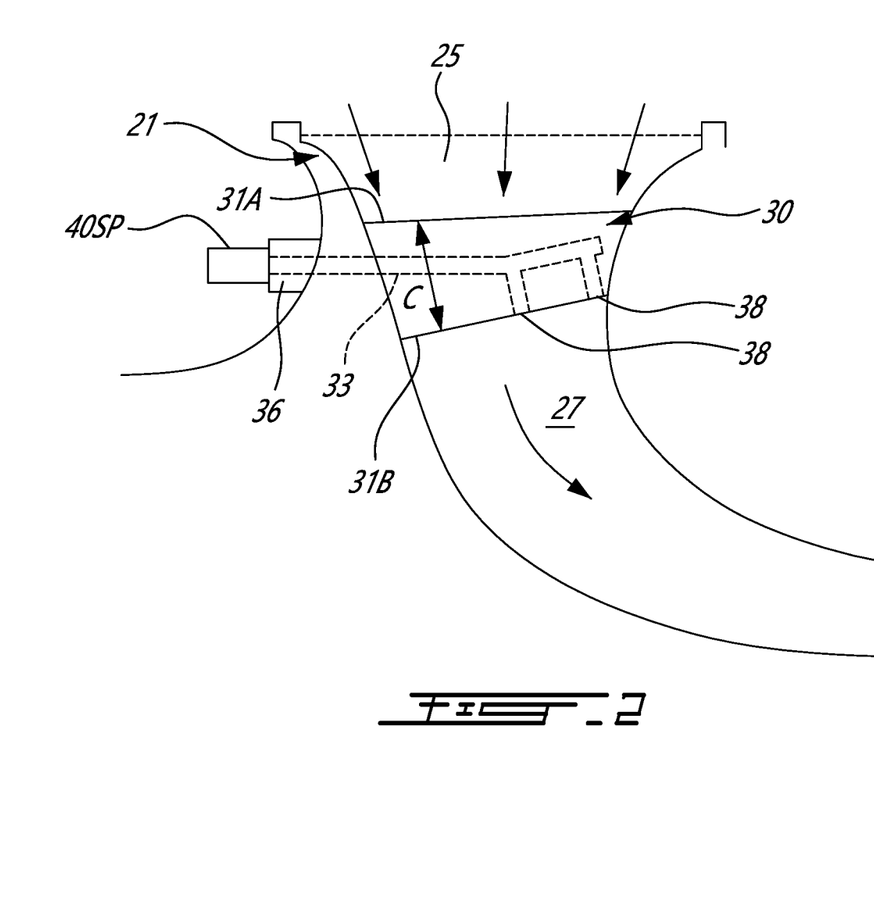
FIG. 2 is an enlarged, schematic cross-sectional view of region IIA in FIG. 1A.

One possible configuration for the static pressure sensor 40SP is now described with reference to FIG. 2. The illustrated strut 30 has one or more internal strut passages 33. Each strut passage 33 is a volume positioned within the body of the strut 30 that is sealed-off from the flow of air along the external surfaces of the strut 30. The strut passage 33 allows for air to flow through the interior of the strut 30 in order to measure a static pressure at a location of the strut 30, as explained in greater detail below. The strut passage 33 may be formed by drilling, etching, milling or any other operation for forming an internal volume within the material thickness of the strut 30. Referring to FIG. 2, the strut passage 33 extends to, through or is otherwise in fluid communication with, the static pressure sensor 40SP. The fluid communication between the static pressure sensor 40SP and the strut passage 33 allows the static pressure sensor 40SP to obtain a pressure reading from the air within the strut passage 33. The static pressure sensor 40SP is fixedly mounted to the strut 30 or to any adjacent fixed structure using any suitable attachment technique. For example, and referring to FIG. 2, the engine casing includes a boss 36 defining a groove for receiving the static pressure sensor 40SP. The static pressure sensor 40SP is attached to the engine inlet casing through the boss 36, where the base of the groove of the boss 36 has an opening in fluid communication with the strut passage 33. The boss 36 has an opening in fluid communication with the strut passage 33. The internal strut passage 33 is thus in fluid communication with the static pressure sensor 40SP when it is mounted to the strut 30. Referring to FIG. 2, the strut passage 33 extends from a root of the strut 30 towards a tip of the strut 30. In an alternate embodiment, the strut passage 33 is defined by a fluid line which extends along an external surface of the strut 30 to the static pressure sensor 40SP. In an alternate embodiment, the static pressure sensor 40SP is remotely mounted away from the strut 30 and the engine casing. In such an alternate embodiment, a tube may extend from the boss 36 and be routed to a port of the static pressure sensor 40SP.

The strut 30 has additional components which allow for a pressure reading of the air at locations on the strut 30 to be generated. Referring to FIG. 2, the strut 30 has multiple static pressure measurement taps 38 at the trailing edge 31B of the strut 30. The static pressure measurement taps 38 allow the static pressure sensor 40SP to generate a reading of the static pressure at the static pressure measurement taps 38 (sometimes referred to herein simply as "taps 38") along the trailing edge 31B. In an embodiment, and referring to FIG. 2, the taps 38 are used to obtain a reading of only the static pressure at the location of the taps 38 on the trailing edge 31B. The static pressure is the pressure applied by the air at the location of the taps 38 when the air has a substantially zero local velocity relative to the taps 38. In an embodiment, the taps 38 exclude, prevent, or reduce the measurement of any dynamic pressure component of the air at the location of the taps 38, where the dynamic pressure is the pressure applied by the air as a result of its motion relative to the taps 38. The static pressure sensor 40SP may be located elsewhere in the air inlet 11, or may function to provide a measurement of the static pressure at different locations of the air inlet 11.

Referring to FIG. 1A, another possible sensor 40 for the engine 10 is a compressor discharge pressure sensor 40CD. The compressor discharge pressure sensor 40CD may take any configuration (e.g. a tap, a probe, etc.) which is capable of measuring or recording the pressure of the air after it has been compressed and discharged by the compressor 12, sometimes referred to herein as the "compressor discharge pressure" or the "P3" pressure, where the number "3" is used to designate the position of the compressor discharge pressure sensor 40CD at the outlet of the compressor 12. The compressor discharge pressure sensor 40CD is disposed downstream of the compressor 12.

Referring to FIG. 1A, another possible sensor 40 for the engine 10 is a shaft sensor 40P. The shaft sensor 40P may take any configuration (e.g. a probe, meter, optical, magnetic, etc.) which is capable of measuring or recording the power of an output shaft 120 of the engine 10. The output shaft 120 is an elongated body that is rotatable about a shaft axis (in FIG. 1A, the shaft axis is collinear with the center axis 17). The output shaft 120 conveys power from the turbine 18 to a load driven by the engine 10, which in the configuration of the engine 10 of FIG. 1A, is the driven gear train 16A. The shaft sensor 40P is capable of measuring or recording the power of the output shaft 120, which sometimes referred to herein by the parameter "SHPN". Referring to FIG. 1C, another possible sensor 40 for the engine 10 is a speed sensor 40N. The speed sensor 40N may take any configuration (e.g. a probe, mechanical, optical, magnetic, etc.) which is capable of measuring or recording the rotational speed of the fan 16C about the fan axis, sometimes referred to herein by the parameter "N1", where the number "1" is used to designate the position of the speed sensor 40N at the air inlet 11.

The aircraft engine 10, or the aircraft to which the engine 10 is mounted, may have additional sensors 40. For example, the aircraft may have a pitot tube to measure an airspeed of the aircraft or the dynamic pressure of the air at the location of the pitot tube. Another example of a sensor 40 of the engine 10, and referring to FIG. 1A, is a combustor discharge sensor 40Q at a vane of the turbine section 18. The combustor discharge sensor 40Q may take any configuration (e.g. a tap, a probe, etc.) which is capable of measuring or recording the pressure of the hot combustion gases after they exit the combustor 13, sometimes referred to herein by the parameter "Q4", where the number "4" is used to designate the position of the combustor discharge sensor 40Q at the outlet of the combustor 13. The combustor discharge sensor 40Q is disposed downstream of the combustor 13. In an embodiment, the Q4 parameter is not derived from the combustor discharge sensor 40Q, and is instead a value stored in the memory of a computing system or controller of the engine 10. In such an embodiment, the parameter Q4 is a normalized value that characterizes a surface area of a turbine vane downstream of the outlet of the combustor 13. This value is coded into the computing system or controller and does not vary over different engine operating cycles or conditions. In an embodiment, the value for the parameter Q4 is constant for a given engine 10, or a specific serial number of the engine 10.

Another example of a sensor 40 of the engine 10, and referring to FIG. 1A, is a bleed air sensor 40B located where air is bled out of the compressor 12. Air may be bled from the cold section of the engine 10 (i.e. the compressor 12) for different purposes. One possible purpose is to bleed air to pressurize the cabin of the aircraft to which the engine 10 is mounted, and this may sometimes be referred to herein by the parameter "ECS". Another possible purpose is to bleed air to maintain proper operating conditions for the engine 10, such as to prevent surge in the compressor 12 or to reduce the effects of compressor surge, and this may sometimes be referred to herein by the parameter "HBOV". The bleed air sensor 40B may take any configuration (e.g. a tap, a probe, etc.) which is capable of measuring or recording a unit value or a normalized value for the parameters ECS and HBOV. In an embodiment, the bleed air sensor 40B is a device which functions to output a signal indicating whether a bleed valve is actuated to a fully open position, a fully closed position, or is modulating at a position between fully opened and fully closed. The computing system or controller of the engine 10 may be able to determine from this output the bleed air parameter to use. In such a configuration, the bleed air sensor 40B may be a component or feature of the bleed valve. Another example of a sensor 40 of the engine 10, and referring to FIG. 1A, is a temperature sensor 40T located at the air inlet 11. The temperature sensor 40T may take any configuration (e.g. a tap, a probe, etc.) which is capable of measuring or recording the temperature of the air at the air inlet 11, sometimes referred to herein by the parameter "T", where the number "1" is used to designate the position of the temperature sensor 40T at the air inlet 11.

In an embodiment, and referring to FIG. 1A, the sensors 40 convert their readings or measurements into electrical signals that are provided to a controller or control system of the engine 10. For example, the engine 10 of FIG. 1A is used in an aircraft, and the control system for the engine 10 is a full-authority digital engine control (FADEC) 420. The sensors 40 are communicatively coupled to the FADEC 420 for providing information to the FADEC 420. In an embodiment, the FADEC 420 commands one or more of the sensors 40 to provide their measurements or recordings to the FADEC 420. The FADEC 420 may also be coupled to the engine 10 for extracting other information from the engine 10 itself, and for controlling operation of the engine 10.

Referring to FIG. 3, a system for determining the inlet total pressure 400 at the air inlet 11 is disclosed (sometimes referred to herein simply as the "system 400"). The system 400 is composed of, or includes, the FADEC 420 and one or more of the sensor(s) 40. An operator interface 405 may be coupled to the FADEC 420, for example to receive inputs from an operator of the engine 10, and for presenting information outputted by the FADEC 420 to the operator of the engine 10. The FADEC 420 functions to implement the system 400 so as to determine the inlet total pressure P1 of the air at the air inlet 11 of the engine, as described in greater detail below. The inlet total pressure P1 is a total or ram pressure of the air at the air inlet 11, where the inlet total pressure P1 is the combination of the static pressure PS1 and the dynamic pressure at the air inlet 11. The inlet total pressure P1 determined by the system 400 may be used for many different purposes of the engine 10. For example, the inlet total pressure P1 may be used by the FADEC 420 to determine the real pressure ratio across a given stage of the compressor 12, and the overall pressure ratio across all of the stages of the compressor 12. The inlet total pressure P1 is provided to the FADEC 420, and may be used by the FADEC 420 to determine different thermodynamic or aerodynamic properties of the engine 10.

In an embodiment, the system 400 determines the inlet total pressure P1 from one or more other measured properties of the engine 10. The system 400 in an embodiment does not obtain or measure the inlet total pressure P1 directly, and may thus avoid one or more problems associated with trying to measure the inlet total pressure P1 directly. For example, one technique for measuring the inlet total pressure P1 directly involves using a P1 sensor. Such sensors are often complex, add additional weight to the engine and are subjected to icing which may impact engine reliability. By not relying on such a sensor to obtain the inlet total pressure P1, the system 400 may avoid one or more problems associated with such a sensor and may further reduce the weight of the engine 10.

The FADEC 420 includes a mass flow module 410 which functions to provide other components of the FADEC 420 with a value for a mass flow W1C at the air inlet 11. The mass flow W1C calculated or outputted by the mass flow module 410 is a corrected mass flow W1C. The corrected mass flow W1C is a mass flow rate that would pass through the air inlet 11 if the inlet pressure and temperature corresponded to ambient conditions at Sea Level, on a Standard Day (e.g. 101.325 kPa, 288.15 K). The mass flow W1C may be provided by the mass flow module 410 as an output in units of mass per unit of time. One or more inputs from the engine 10 and/or from the FADEC 420 are provided to the mass flow module 410 in order to determine the mass flow W1C.

Referring to FIG. 3, one such input is a first inlet total pressure P1IN. In an embodiment, such as when the FADEC 420 is powered up, the first inlet total pressure P1IN is an initial estimate or initial guess of the value of the inlet total pressure P1 and is thus sometimes referred to herein as the "initial inlet total pressure P1IN". As explained in greater detail below, the first inlet total pressure P1IN will be replaced or substituted with a revised inlet total pressure P1R after the FADEC 420 has performed one or more iterations to achieve the inlet total pressure P1. Therefore, the first inlet total pressure P1IN may be equal to, or the same as, the revised inlet total pressure P1R, after the system 400 has completed at least one iteration. The first inlet total pressure P1IN is thus the first value of the inlet total pressure that is provided to or by the system 400 before it functions to generate the inlet total pressure P1. The first inlet total pressure PIN may be a valued stored in memory and which is provided to the FADEC 420 when it is first started. In the embodiment where the FADEC 420 is starting up and has not yet generated a revised inlet total pressure P1R, the first inlet total pressure P1IN is an initial, first value for the inlet total pressure P1 which may be stored in the FADEC 420, or which may set or selected from a range of values. The range may be defined between a minimum initial inlet total pressure and a maximum initial inlet total pressure. In the embodiment where the FADEC 420 is starting up and has not yet generated a revised inlet total pressure P1R, the FADEC 420 may provide to the mass flow module 410 a value for the initial inlet total pressure P1IN that is one of a finite number (e.g. two) values. In an embodiment, the value for the initial inlet total pressure P1IN that the FADEC 420 provides to the mass flow module 410 is always the same when the FADEC 420 is first started. Therefore, the system 400 begins with a guess of what the inlet total pressure P1 is or will be, and this guess is refined and modified in one or more subsequent iterations.

During some operating conditions of the engine 10, such as prior to engine startup and after shutdown when the FADEC 420 is on but the engine 10 is not drawing air into the air inlet 11, the first inlet total pressure P1IN may be the primary parameter inputted into the mass flow module 410 to determine the mass flow W1C.

During the same or different operating conditions of the engine 10, such as during engine startup or flight, one or more other inputs are provided to the mass flow module 410, in addition to the first inlet total pressure P1IN. Referring to FIG. 3, the discharge pressure P3 of the air discharged from the compressor 12, which is measured with the compressor discharge pressure sensor 40CD, is provided to the mass flow module 410. The discharge pressure P3 is used to define the overall pressure ratio across the compressor 12, which is defined as the discharge pressure P3 or the first inlet total pressure P1IN (or the revised inlet total pressure P1R). The overall pressure ratio is used to estimate the corrected mass flow W1C at the air inlet 11. The mass flow W1C provided by the mass flow module 410 is primarily a function of the overall pressure ratio. However, other parameters/inputs may be provided to the mass flow module 410 in order to further improve the accuracy of the mass flow W1C and/or of the inlet total pressure P1 obtained by the system 400.

Referring to FIG. 3, one example of another such input to the mass flow module 410 is an altitude factor, shown in FIG. 3 as "Delta". Delta is an altitude factor of the aircraft carrying the engine 10. Delta is a normalised parameter that is a function of the atmospheric pressure at the altitude divided by atmospheric pressure at sea level. The atmospheric pressure may be provided by the pitot tube. Another example of an additional input to the mass flow module 410 is the correction factor Q4. The correction factor Q4 is provided by the combustor discharge sensor 40Q, or is stored at the FADEC 420. The correction factor Q4 can be used to correct the mass flow W1C based on engine conditions at the outlet of the combustor 13. Another example of an additional input to the mass flow module 410 is the unit value or normalized value for the parameters ECS and HBOV provided by the bleed air sensor 40B (which may be part of the bleed valve). The parameter ECS may have a small impact on the accuracy of value of the revised inlet total pressure P1R that is obtained by the system 400, but may have a larger impact (e.g. approximately 5%) on the accuracy of the value for mass flow W1C that is provided by the mass flow module 410. Of the inputs into the mass flow module 410, the overall pressure ratio may have the greatest impact on the accuracy of the revised inlet total pressure P1R that is obtained by the system 400, and the other inputs into the mass flow module 410 described above may improve the determination or accuracy of the mass flow W1C. One or more of the inputs Delta, Q4, ECS and HBOV may be stored in the FADEC 420.

In an embodiment, and referring to FIG. 3, the mass flow W1C is calculated using another component or functionality of the FADEC 420. The FADEC includes an auxiliary mass flow module 410A which functions to provide a value for the mass flow W1C at the air inlet 11 based on inputs other than the overall pressure ratio. Referring to FIG. 3, one such input is the power SHPN of the output shaft 120 provided by the shaft sensor 40P. The mass flow W1C calculated or outputted by the auxiliary mass flow module 410A and based on the power SHPN is the corrected mass flow W1C. The auxiliary mass flow module 410A may have other inputs, such as those above, or different inputs. For example, and referring to FIG. 3, one of the inputs into the auxiliary mass flow module 410A is the temperature T1 of the air at the air inlet 11, which is provided by the temperature sensor 40T. The temperature T1 provided to the auxiliary mass flow module 410A may represent a temperature value in units of degrees, or may be a normalized value (sometimes referred to as "Theta") which is the temperature at the air inlet 11 divided by the temperature at International Standard Atmosphere (ISA) conditions for sea level. In an embodiment of the engine 10, the temperature sensor 40T is located in close proximity to, or may be incorporated into, the static pressure sensor 40SP. In an embodiment of the engine 10, the temperature sensor 40T is located in close proximity to the taps 38. The auxiliary mass flow module 410A thus provides another technique for determining W1C based primarily on the normalized power SHPN of the output shaft 1200, where the other inputs into the auxiliary mass flow module 410A described above may improve the determination or accuracy of the mass flow W1C. In the embodiment where the input into the auxiliary mass flow module 410A is the power SHPN, the auxiliary mass flow module 410A is used to determine the mass flow W1C for a turboprop engine 10 such as the one shown in FIG. 1B, or for a turboshaft engine 10 such as the one shown in FIG. 1A. For example, the auxiliary mass flow module 410A will use the power SHPN as the primary input when the aircraft engine 10 is a turboprop or turboshaft engine 10.

In an embodiment, and referring to FIG. 3, the auxiliary mass flow module 410A may also function to provide a value for the mass flow W1C at the air inlet 11 based on another input. This input is the rotational speed N1 of the fan 16C, which is measured by the speed sensor 40N and provided to the FADEC 420 by the speed sensor 40N. The rotation speed N1 may be provided by the speed sensor 40N, or manipulated by the FADEC 420, to be employed in the auxiliary mass flow module 410A as a corrected fan speed N1C. The auxiliary mass flow module 410A thus provides another technique for determining W1C based primarily on the rotational speed N1 of the fan 16C, where the other inputs into the auxiliary mass flow module 410A described above may improve the determination or accuracy of the mass flow W1C. In the embodiment where the input into the auxiliary mass flow module 410A is the rotational speed N1, the auxiliary mass flow module 410A is used to determine the mass flow W1C for a turbofan engine 10, such as the one shown in FIG. 1C. For example, the auxiliary mass flow module 410A will use the rotational speed N1 as the primary input when the aircraft engine 10 is a turbofan engine 10.

In an embodiment, and referring to FIG. 3, the mass flow module 410 and the auxiliary mass flow module 410A operate simultaneously and separately to generate separate and different values for the mass flow W1C, but only the mass flow W1C output from one of the mass flow module 410 and the auxiliary mass flow module 410A is provided to be used by the system 400 to determine the inlet total pressure P1. The mass flow W1C output from the mass flow module 410 may be more accurate (i.e. more representative of actual mass flow at the air inlet 11) than the mass flow W1C output from the auxiliary mass flow module 410A. However, the system 400 still determines the mass flow W1C in the auxiliary mass flow module 410A (as a function of the power SHPN or the speed N1) in parallel to the mass flow module 410, in case the mass flow module 410 is unable to provide the mass flow W1C. This may occur if the compressor discharge pressure sensor 40CD malfunctions or becomes inoperative, for example, such that it cannot provide the discharge pressure P3 to the mass flow module 410. In such an eventuality, the system 400 has a built-in redundancy and back-up in the auxiliary mass flow module 410A, which will continue to output the mass flow W1C based on an input of the shaft power SHPN from the shaft sensor 40P (for turboprop or turboshaft engines 10) or based on an input of the rotational speed N1 from the speed sensor 40N (for turbofan engines 10).

When the mass flow module 410 and the auxiliary mass flow module 410A operate simultaneously and separately to generate the mass flow W1C, the mass flow W1C from the auxiliary mass flow module 410A is the mass flow W1C used by the system 400 to determine the inlet total pressure P1 in the event that the mass flow W1C from the mass flow module 410 cannot be provided. An example of this logic is shown in FIG. 3. The FADEC 420 has a gate 412. The gate 412 receives the mass flow W1C from both the mass flow module 410 and the auxiliary mass flow module 410A. The gate 412 includes a switch 412A. The switch 412A is responsive to a fault condition associated with the mass flow module 410. For example, if the compressor discharge pressure sensor 40CD is functioning normally and providing the discharge pressure P3 to the mass flow module 410 (which may be a default condition), there is no fault condition and the switch 412A will allow the mass flow W1C from the mass flow module 410 to be used by the system 400. Alternatively, if the compressor discharge pressure sensor 40CD is malfunctioning and/or incapable of providing the discharge pressure P3 to the mass flow module 410, there is a fault condition and the switch 412A will move to allow the mass flow W1C from the auxiliary mass flow module 410A to be used by the system 400.

The system 400 thus provides for estimating, calculating, and/or computing the mass flow W1C of the air at the air inlet 11 using the first inlet total pressure P1IN, the measured compressor discharge pressure P3, and possibly other measured parameters including, but not limited to, the shaft power SHPN and the fan rotational speed N1. While the mass flow W1C is an intermediary property used by the system 400 to determine the inlet total pressure P1, as explained in greater detail below, it may also be a valuable property on its own when performing different calculations and assessments of engine 10 performance and operation. For this reason, and as shown in FIG. 3, each of the mass flow module 410 and the auxiliary mass flow module 410A may output their mass flows W1C to other portions of the FADEC 420 or engine 10. The system 400 therefore allows for the mass flow W1C at the air inlet 11 to be used by the FADEC 420 or the engine 10 for other purposes not related to pressure determination. In an alternate embodiment, the mass flow W1C is provided by only the mass flow module 410 using the overall pressure ratio as described above. In an alternate embodiment, the mass flow W1C is provided by only the auxiliary mass flow module 410A using the shaft power SHPN as described above. In an alternate embodiment, the mass flow W1C is provided by only the auxiliary mass flow module 410A using the fan rotational speed N1 as described above.

After the system 400 has determined the mass flow W1C, the mass flow W1C is used to determine the Mach number of the air at the air inlet 11. Referring to FIG. 3, the FADEC 420 includes a Mach number module 430 which functions to provide other components of the FADEC 420 with a value for the Mach number at the air inlet 11. The mass flow W1C is the primary input to the Mach number module 430. Using the mass flow W1C, and optionally other inputs, the Mach number module 430 outputs a calculated, estimated, or computed Mach number for the system 400 to use in determining the inlet total pressure P1. The Mach number module 430 may function to generate the Mach number using computational fluid dynamics (CFD) tables or curves which relate various values for the corrected mass flow W1C at the air inlet 11 to various values for the Mach number. Thus, the Mach number module 430 may perform CFD, or rely on existing CFD analysis, to establish a correlation between corrected mass flow W1C and the Mach number at the air inlet 11.

In an embodiment, and referring to FIG. 3, the Mach number of the air at the air inlet 11 is determined using other inputs for the Mach number module 430, in addition to the primary input of mass flow W1C. One example of such an input is the speed of the aircraft having the aircraft engine 10, shown in FIG. 3 by the parameter "VTAS". The aircraft speed VTAS may be provided by the pitot tube of the aircraft. The aircraft speed VTAS may be provided to the Mach number module 430 as a "true" airspeed, which is the speed of the aircraft relative to the air mass through which the aircraft is flying. In an embodiment, the aircraft speed VTAS is not a separate input, but is instead incorporated into the CFD tables or curves which relate various values for the corrected mass flow W1C at the air inlet 11 to various values for the Mach number. Another example of an additional input to the Mach number module 430 is the configuration of the aircraft having the aircraft engine 10, shown in FIG. 3 by the parameter "AC". The configuration AC may be a numerical value representative of a characteristic or feature of the aircraft and/or the engine 10. For example, the configuration AC may be a numerical value representative of the engine 10 being used in a helicopter or an airplane, since these configurations may influence the Mach number at the air inlet 11. For example, the configuration AC may be a numerical value representative of the engine 10 being mounted on the left or on the right of the aircraft, since these configurations of the engine 10 may influence the Mach number at the air inlet 11. In an embodiment, the value for the configuration AC is stored in the memory of the FADEC 420 and is not an input provided from outside of the FADEC 420.

After the system 400 has determined the Mach number, the Mach number is used to determine a pressure ratio of the air at the air inlet 11. The pressure ratio is defined as the revised inlet total pressure P1R at the air inlet 11 over an estimate of the static pressure PS1E of the air at the air inlet 11. Referring to FIG. 3, the FADEC 420 includes, embodies and/or uses one or more curve(s) 440 which plot the pressure ratio as a function of the Mach number, according to the following equation:

$$\frac{P1R}{PS1E} = f(Mach)$$

Using the Mach number from the Mach number module 430, the curve(s) 440 are able to compute or calculate the pressure ratio P1R/PS1E using, for example, a one-dimensional isentropic compressible flow function or equivalent. The system 400 may then use the pressure ratio P1R/PS1E in determining the inlet total pressure P1. The curve(s) 440 may assume certain properties, such as gamma being 1.4, where gamma is a property of the air at the cold section of the engine 10. In a conventional application where the Mach number is already known, the pressure ratio can be computed from the known Mach number using the one-dimensional isentropic compressible flow function. However, since the Mach number is not known by the system 400 before it is estimated in the Mach number module 430, it is required to first estimate the Mach number from the corrected mass flow W1C. However, the prediction of corrected mass flow W1C itself requires knowing in advance the value for the inlet total pressure P1 such as by measuring it directly (which may have disadvantages explained above), but this is the variable that the system 400 is trying to determine in the first place because the system 400 does not directly measure the inlet total pressure P1 in an embodiment. The system 400 thus performs one or more iterations to overcome this difficulty, as explained in greater detail below.

Referring to FIG. 3, the FADEC 420 includes a static pressure module 450. The static pressure module 450 functions to provide other components of the FADEC 420 with a value for the real static pressure PSR at the air inlet 11. The measured static pressure PS1 obtained from the static pressure sensor 40SP is the primary input into the static pressure module 450. The static pressure module 450 outputs a calculated, estimated, or computed real static pressure PSR for the system 400 to use in determining the inlet total pressure P1. The static pressure module 450 may function to generate the real static pressure PSR using CFD tables or curves which relate various values for the measured static pressure PS1 at the air inlet 11 to various values for the actual or real static pressure PSR. Thus, the static pressure module 450 may perform CFD, or rely on existing CFD analysis, to establish a correlation between measured static pressure PS1 and the real static pressure PSR at the air inlet 11. For example, in some instances, it may be necessary to correct a probe measurement of the static pressure PS1, using a process called "measure to real" compensation, to get the real value for the static pressure PSR. In an alternate embodiment, the static pressure module 450 does not receive an input of the measured static pressure PS1 from the static pressure sensor 40SP, and instead outputs the real static pressure PSR that has been approximated from other variables (measured or approximated), such as an altitude of the engine 10.

The real static pressure PSR from the static pressure module 450 is combined in the FADEC 420 with the pressure ratio P1R/PS1E to obtain the revised inlet total pressure P1R. Referring to FIG. 3, the FADEC 420 has a multiplier 460. The inputs to the multiplier 460 are the pressure ratio P1R/PS1E from the curve(s) 440 and the real static pressure PSR from the static pressure module 450. In an alternate embodiment, one of the inputs into the multiplier 460 is the measured static pressure PS1 instead of the real static pressure PSR. The revised inlet total pressure P1R is a modified or updated version of the first inlet total pressure P1IN, in that the revised inlet total pressure P1R is the result of the manipulations and calculations performed on the first inlet total pressure P1IN by the features of the system 400 and the inputs provided thereto.

After a first iteration of the system 400, it is possible that the revised inlet total pressure P1R is representative of the actual inlet total pressure P1 of the air at the air inlet 11. In another embodiment, after a first iteration of the system 400, it is possible that the revised inlet total pressure P1R is not representative of the actual inlet total pressure P1 of the air at the air inlet 11. The system 400 therefore allows for the revised inlet total pressure P1R determined after a first iteration of the system 400 to be plugged back into the system 400 to run another iteration and obtain another revised inlet total pressure P1R that is more representative of the actual inlet total pressure P1.

Referring to FIG. 3, the revised inlet total pressure P1R is sent back to one or both of the mass flow module 410 and the auxiliary mass flow module 410A. The revised inlet total pressure P1R is provided as an input to substitute or replace the first inlet total pressure P1IN, and one or both of the mass flow module 410 and the auxiliary mass flow module 410A are operated to provide a new and revised mass flow W1C. By "substitute" or "replace", it is understood as being any one of: using the revised inlet total pressure P1R instead of the first inlet total pressure P1IN, assigning the value of the revised inlet total pressure P1R to the first inlet total pressure P1IN and rerunning the sequence with the first inlet total pressure P1IN having the updated value, and any other combination that has the effect of rerunning the sequence with the newly obtained value.

Referring to FIG. 3, the FADEC 420 may have a delay module 470. The delay module 470 stores in memory the revised inlet total pressure P1R received from the multiplier 460. The delay module 470 transmits the revised inlet total pressure P1R to both of the mass flow module 410 and the auxiliary mass flow module 410A. The delay module 470 may transmit the revised inlet total pressure P1R after a time delay, so as to permit the flow conditions of air at the air inlet 11 to change or settle before the system 400 performs another iteration. The delay module 470 may establish a cycle or scan duration, during which the system 400 must output the revised inlet total pressure P1R to the delay module 470. The delay module 470 may then provide the revised inlet total pressure P1R to both of the mass flow module 410 and the auxiliary mass flow module 410A at the end of the cycle or scan duration. The time delay or scan duration may be any unit of time. One possible and non-limiting example of a time delay or scan duration for the delay module 470 is 24 ms, such that the FADEC 420 runs an iteration of the system 400 every 24 ms.

Once the revised inlet total pressure P1R is received at the mass flow module 410 and the auxiliary mass flow module 410A, the system 400 is run again with the revised inlet total pressure P1R (and with subsequent values of the revised inlet total pressure P1R). The system 400 thus allows for indirectly determining the actual inlet total pressure P1 at the air inlet 11 from one or more other measured parameters. In particular, the system 400 allows for indirectly determining the actual inlet total pressure P1 at the air inlet 11 using the static pressure PS1 as the only input of pressure of the air at the air inlet 11. The system 400 also allows for indirectly determining the actual inlet total pressure P1 at the air inlet 11 using input from other sensors 40 that are often already available on engines 10 and that are not subjected to icing, therefore increasing the reliability of the inlet total pressure P1 without adding additional sensors and thus weight to the engine 10. These other sensors 40 which are already available include, but are not limited to, the compressor discharge pressure sensor 40CD, the power sensor 40P, the temperature sensor 40T, and the bleed air sensor 40B. The system 400 thus allows for accurately determining the inlet total pressure P1 without having to directly measure it. In an alternate embodiment, the inlet total pressure P1 may be directly measured with a sensor to validate the inlet total pressure P1 determined by the system 400, or as a redundancy to the inlet total pressure P1 determined by the system 400.

The system 400 may or may not have a convergence criteria to determine when/if the revised inlet total pressure P1R converges to a converged inlet total pressure P1C. The converged inlet total pressure P1C is a final value that is achieved after one or more iterations, and is, or corresponds to, the actual inlet total pressure P1. In an example of the system 400 iterating with a convergence criteria, the system 400 may repeat or iterate with different values for the revised inlet total pressure P1R until the values of the revised inlet total pressure P1R determined by the system 400 are numerically stable. Stated differently, the values of the revised inlet total pressure P1R determined by the system 400 over multiple cycles/iterations are substantially the same (i.e. within a given threshold/tolerance). This may be an indication that subsequent iterations of the system 400 will not provide changes to the determined revised inlet total pressure P1R, which may indicate that the revised inlet total pressure P1R has converged to the converged inlet total pressure P1C. In another example of the system 400 iterating with a convergence criteria, the system 400 may repeat or iterate with different values for the revised inlet total pressure P1R until the "output" equals the "input". Stated differently, the system 400 continues to iterate until the revised inlet total pressure P1R that is substituted into the mass flow module 410 and auxiliary mass flow module 410A is equal or substantially similar to the revised inlet total pressure P1R obtained at the multiplier 460.

Alternatively, the system 400 may iterate without requiring convergence. In an example of the system 400 iterating without a convergence criteria, the system may repeat or iterate with different values for the revised inlet total pressure P1R for a fixed or predetermined number of additional cycles. In an embodiment, the number of cycles is one additional cycle, such that the system 400 iterates with the revised inlet total pressure P1R a single additional instance. In at least some applications and engines with which the claimed method 100 and system 400 are used, a single additional sequence provides a reliable value and carries additional benefits of: a) reduced load at the controller and reduced energy consumption, due to requiring fewer operations than at least some prior art iterative processes; and b) may in some applications and on some engines improve engine reliability by making the iteration immune to possible engine sensor operation disruptions. In an embodiment, the number of cycles is greater than two. In an embodiment, the number of cycles is less than ten. In an embodiment, the number of cycles is between 2 and 10, inclusively. After the last cycle, the revised inlet total pressure P1R is considered sufficiently representative of the inlet total pressure P1, and thus defines the inlet total pressure P1.

In another example of the system 400 iterating without a convergence criteria, the system 400 may repeat or iterate with different values for the revised inlet total pressure P1R for a fixed duration or period of time. All of the iterations or loops of the system 400 may be completed within a specific or fixed period (e.g. 24 ms). After the fixed period has ended, the revised inlet total pressure P1R is considered sufficiently representative of the inlet total pressure P1, and thus defines the inlet total pressure P1.

In another example of the system 400 iterating without a convergence criteria, the system 400 (e.g. the delay module 470) defines a cycle or scan time which establishes a limit for how long the system 400 has to complete one iteration or one cycle of the system and output the revised inlet total pressure P1R to the delay module 470. At the end of the cycle or scan time, the delay module 470 outputs the revised inlet total pressure P1R to the mass flow modules 410,410A. Thus, the delay module 470 defines the duration of one cycle or iteration of the system 400. The system 400 will continue executing a fixed number of one or more additional instances/iterations, where each additional instance/iteration has the same cycle or scan time defined by the delay module 470. After completing the fixed number of additional instances/iterations, the last revised inlet total pressure P1R will be considered sufficiently representative of the inlet total pressure P1, and thus defines the inlet total pressure P1. The iterations of the system 400 are thus predictable in terms of time, which may be desirable in systems like the FADEC 420 which may need to complete all algorithms in a prescribed time. Thus, by not using a convergence criteria, the system 400 may be considered to be deterministic in terms of time. This technique of iterating without a convergence criteria may reduce the load on the computer processing unit.

In an embodiment, when the FADEC 420 is powered on, the initial inlet total pressure P1IN may not be accurate, but the revised inlet total pressure P1R may quickly become representative of the inlet total pressure P1 after only one or more additional iterations of the system 400. The revised inlet total pressure P1R may still be provided to other systems of the engine 10 even before it has become representative. In an embodiment, after a pilot has powered on the FADEC 420, the revised inlet total pressure P1R may already have become representative of the inlet total pressure P1 and the inlet total pressure P1 determined before the pilot turns on the engine 10. It can thus be appreciated that, in at least some embodiments, after the first inlet total pressure P1IN is provided, the system 400 is able to have the inlet total pressure obtained relatively quickly. In an embodiment, the first inlet total pressure P1IN is provided only once when the FADEC 420 is powered on while the engine 10 is on the ground. When the engine 10 is airborne, the system 400 may be run again, and will use the value for the revised inlet total pressure P1R that was generated after the last iteration and which is stored in the delay module 470.

Figure 4:
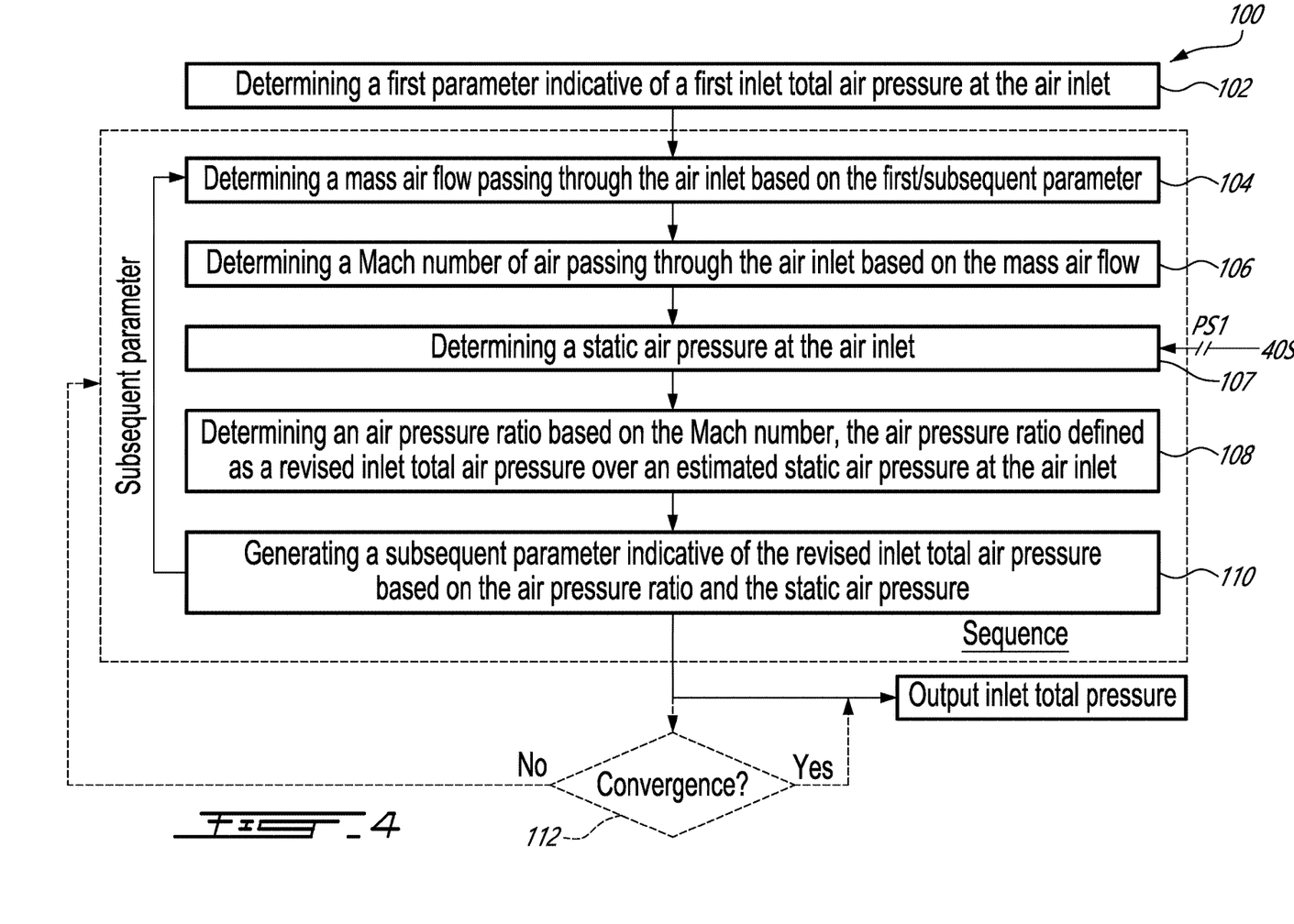
FIG. 4 is a flowchart of an example method for determining an inlet total pressure.

Referring to FIG. 4, there is disclosed a method 100 of determining the inlet total pressure P1 of air at the air inlet 11 of the aircraft engine 10. The method 100 is performed on a computing device, such as the FADEC 420 or other suitable device or controller. At 102, the method 100 includes setting or determining the first inlet total pressure P1IN. This may be done, for example, while the engine 10 is grounded. Alternatively, step 102 may involve using the revised inlet total pressure P1R obtained from a previous iteration of the method 100. This may be done by selecting the initial inlet total pressure P1IN from a range defined between maximum and minimum values. The first inlet total pressure P1N may be computed or used as a parameter, sometimes referred to herein as the "first parameter". The first parameter may be any single value or multiple values that are representative of the value of first inlet total pressure P1N, and which is coded or configured to be used in the method 100 and system 400.

The method 100 includes performing or executing a routine or sequence that includes the following actions. The use of term "sequence" does not require the actions to be performed sequentially or in series. In an embodiment, the actions are performed sequentially or in series. In an alternate embodiment, the actions are performed non-sequentially. At 104, the sequence includes determining the mass flow W1C of air passing through the air inlet 11 using the first parameter which is representative of the first inlet total pressure P1N, or by using a parameter representative of the revised inlet total pressure P1R from a previous iteration or cycle. This may be done, for example, using one or both of the mass flow module 410 and the auxiliary mass flow module 410A. At 106, the sequence includes determining the Mach number of air passing through the air inlet 11 using the mass flow W1C. This may be done, for example, using the Mach number module 430. At 107, the sequence includes determining the static air pressure PS1 at the air inlet 11. This may be done, for example, by receiving the static pressure PS1 from the static pressure sensor 40SP. At 108, the sequence includes determining the air pressure ratio P1R/PS1E using the Mach number, where the pressure ratio P1R/PS1E is defined as the revised inlet total pressure P1R over the estimated static pressure PS1E of air at the air inlet 11. At 110, the sequence includes generating a subsequent parameter that is indicative of the revised inlet total air pressure P1R based on the air pressure ratio P1R/PS1E and the static air pressure PS1. The revised inlet total pressure P1R may be computed or used as a parameter, sometimes referred to herein as the "subsequent parameter". The subsequent parameter may be any single value or multiple values that are representative of the value of revised inlet total pressure P1R, and which is coded or configured to be used in the method 100 and system 400. Step 110 may include receiving the static pressure PS1 of air at the air inlet 11 that is measured with the static pressure sensor 40SP, and multiplying the pressure ratio P1R/PS1E with the static pressure PSR to obtain the revised inlet total pressure P1R. The sequence includes substituting the subsequent parameter from step 110 for the first parameter in step 104, thereby allowing the method 100 to run another iteration or cycle using the revised inlet total pressure P1R.

The method steps 104 to 110 forming the sequence are repeated with the subsequent parameter (i.e. the revised inlet total pressure P1R) in place of the first parameter (i.e. the first inlet total pressure P1IN), in order to obtain another revised inlet total pressure P1R. The revised inlet total pressure P1R may then be outputted as the inlet total pressure P1. In one possible configuration, and as shown at decision node 112, the method 100 may continue to perform one or more additional instances of the sequence, using the revised inlet total pressure P1R, until the revised inlet total pressure P1R converges to the converged inlet total pressure P1C, which is then outputted as the inlet total pressure P1. The method 100 may output the inlet total pressure P1 to the FADEC 420 and/or to other systems or components of the engine 10.

Figure 5:
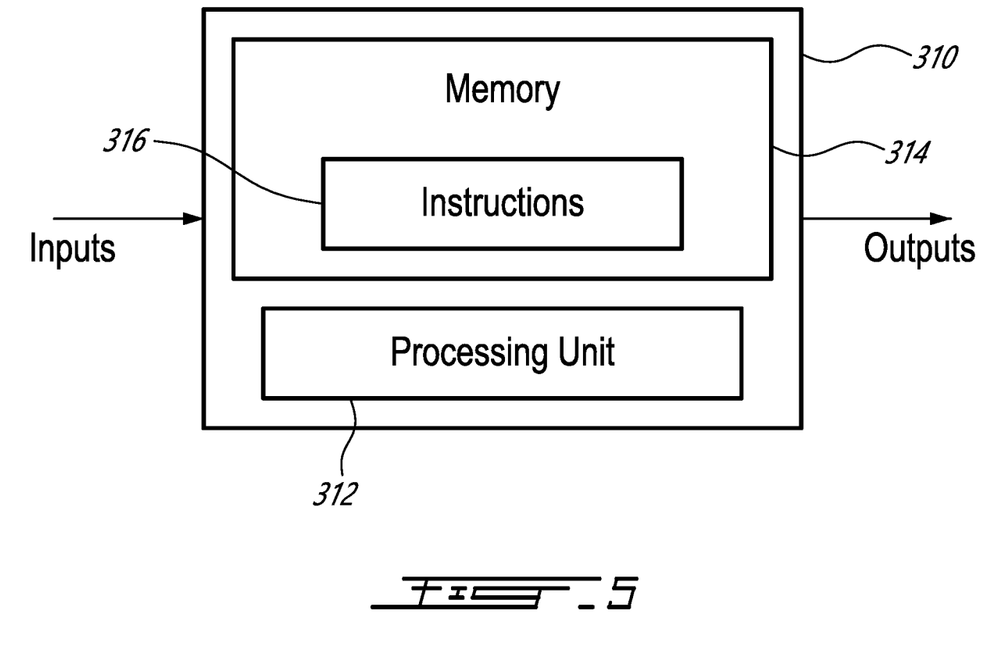
FIG. 5 is a block diagram of an example computer system for implementing part or all of the method of FIG. 4.
Figure 9:
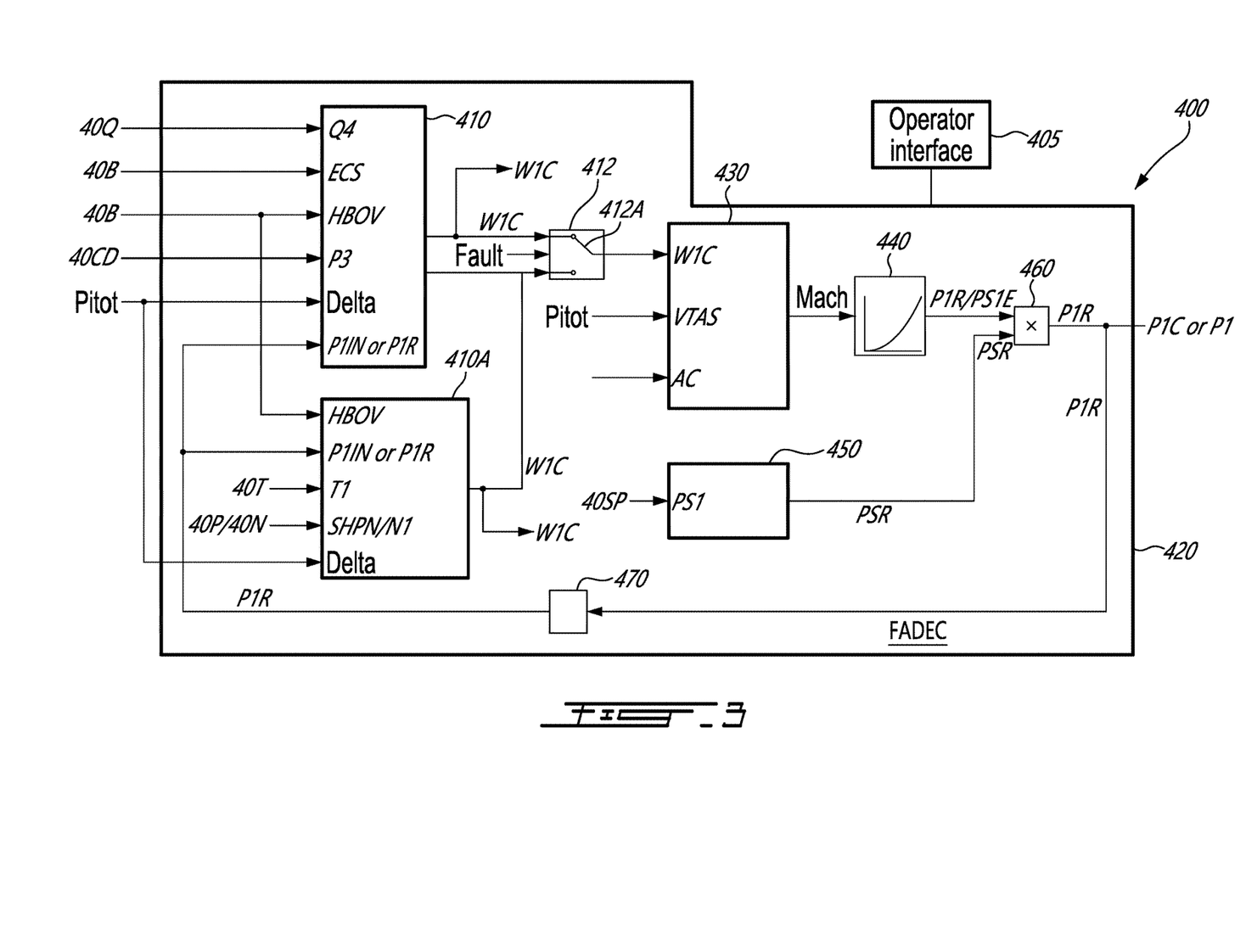

With reference to FIG. 5, an example of a computing device 310 is illustrated. For simplicity only one computing device 310 is shown but the system 400 may include more computing devices 310 operable to exchange data. The computing devices 310 may be the same or different types of devices. The system 400 and/or method 100 may be implemented with one or more computing devices 310. Note that the system 400 and/or method 100 may be implemented as part of a full-authority digital engine controls (FADEC) 420 or other similar device, including electronic engine control (EEC), engine control unit (ECU), electronic propeller control, propeller control unit, and the like. In some embodiments, the system 400 and/or method 100 is implemented as a Flight Data Acquisition Storage and Transmission system, such as a FAST™ system. The system 400 and/or method 100 may be implemented in part in the FAST™ system and in part in the EEC. Other embodiments may also apply.

The computing device 310 comprises a processing unit 312 and a memory 314 which has stored therein computer-executable instructions 316. The processing unit 312 may comprise any suitable devices configured to implement the system 400 and/or method 100 such that instructions 316, when executed by the computing device 310 or other programmable apparatus, may cause the functions/acts/steps performed as part of the system 400 and/or method 100 as described herein to be executed. The processing unit 312 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 314 may comprise any suitable known or other machine-readable storage medium. The memory 314 may comprise non-transitory computer readable storage medium, for example, but not limited to, an electronic, magnetic, optical, electromagnetic, infrared, or semiconductor system, apparatus, or device, or any suitable combination of the foregoing. The memory 314 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 314 may comprise any storage means (e.g., devices) suitable for retrievably storing machine-readable instructions 316 executable by processing unit 312.

The methods and systems for determining the inlet total pressure described herein may be implemented in a high level procedural or object oriented programming or scripting language, or a combination thereof, to communicate with or assist in the operation of a computer system, for example the computing device 310. Alternatively, the methods and systems for determining the inlet total pressure may be implemented in assembly or machine language. The language may be a compiled or interpreted language. Program code for implementing the methods and systems for determining the inlet total pressure may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for determining the inlet total pressure may also be considered to be implemented by way of a non-transitory computer-readable storage medium having a computer program stored thereon. The computer program may comprise computer-readable instructions which cause a computer, or more specifically the processing unit 312 of the computing device 310, to operate in a specific and predefined manner to perform the functions described herein, for example those described in the system 400 and/or method 100.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

In addition, it should be noted that the system 400 and/or method 100 and, more generally, the techniques described herein can be performed substantially in real-time, during operation of the engine 10. For example, if the engine 10 is used as part of an aircraft, the determination of the inlet total pressure P1 of the engine 10 can be performed in real-time during a flight mission. The results of the determination can be reported to the operator and adjustments to the operational parameters of the engine 10 can also be performed in real-time. Thus, the computing device 310 can be used to dynamically determine the inlet total pressure P1 of the air inlet 11 of the engine 10 in substantially real-time.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A method of determining an inlet total air pressure of air at an air inlet of an aircraft engine, the method comprising:
   determining, at a computing device, a first parameter indicative of a first inlet total air pressure at the air inlet;
   executing, at the computing device, a sequence that includes:
   determining, at the computing device, a mass air flow passing through the air inlet based on the first parameter;
   determining, at the computing device, a Mach number of air passing through the air inlet based on the mass air flow;
   determining, at the computing device, a static air pressure at the air inlet;
   determining, at the computing device, an air pressure ratio based on the Mach number, the air pressure ratio defined as a revised inlet total air pressure over an estimated static air pressure at the air inlet;
   generating, at the computing device, a subsequent parameter indicative of the revised inlet total air pressure based on the air pressure ratio and the static air pressure; and
   substituting, at the computing device, the subsequent parameter for the first parameter;

executing, at the computing device, at least one additional instance of the sequence with the subsequent parameter; and outputting, at the computing device, the subsequent parameter as the inlet total air pressure.

2. The method of claim 1, wherein determining the static air pressure at the air inlet includes receiving, at the computing device, a measured static air pressure at the air inlet.

3. The method of claim 1, comprising determining, at the computing device, a discharge pressure of air discharged from a compressor of the aircraft engine, wherein determining the mass air flow includes determining the mass air flow based on an overall pressure ratio defined as the discharge pressure over the first inlet total air pressure.

4. The method of claim 1, comprising:
receiving, at the computing device, a power of an output shaft of the aircraft engine; and
determining, at the computing device, a discharge pressure of air discharged from a compressor of the aircraft engine;
wherein determining the mass air flow includes:
determining the mass airflow based on an overall pressure ratio defined as the discharge pressure over the first inlet total air pressure;
concurrently with determining the mass air flow based on the overall pressure ratio, determining the mass air flow based on the power of the output shaft; and
using the mass air flow from the power of the output shaft to determine the Mach number if the mass air flow based on the overall pressure ratio is unavailable.

5. The method of claim 1, comprising:
receiving, at the computing device, a speed of a fan of the aircraft engine; and
determining, at the computing device, a discharge pressure of air discharged from a compressor of the aircraft engine;
wherein determining the mass air flow includes:
determining the mass air flow based on an overall pressure ratio defined as the discharge pressure over the first inlet total air pressure;
concurrently with determining the mass air flow based on the overall pressure ratio, determining the mass air flow based on the speed of the fan; and
using the mass air flow from the speed of the fan to determine the Mach number if the mass air flow from the overall pressure ratio is unavailable.

6. The method of claim 1, wherein determining the mass air flow includes determining the mass air flow based on at least one of: an altitude factor of the aircraft engine, a correction factor at a combustor of the aircraft engine, bleed air extracted from a compressor of the aircraft engine, and air temperature at the air inlet.

7. The method of claim 1, wherein executing the at least one additional instance of the sequence includes executing a predetermined number of additional instances of the sequence.

8. The method of claim 7, wherein the predetermined number of additional instances is a single additional instance.

9. The method of claim 1, wherein:
executing the at least one additional instance of the sequence includes executing multiple instances of the sequence until the subsequent parameter converges to a converged parameter indicative of a converged inlet total air pressure; and
outputting the subsequent parameter includes outputting, at the computing device, the converged inlet total air pressure as the inlet total air pressure.

10. The method of claim 1, wherein executing the sequence includes executing the sequence within a fixed period.

11. The method of claim 1, wherein determining the Mach number includes determining the Mach number based on the mass air flow and on at least one of: a speed of an aircraft having the aircraft engine, and a configuration of the aircraft.

12. The method of claim 1, wherein determining the first parameter indicative of the first inlet total air pressure at the air inlet includes selecting the first parameter from a range defined between a minimum parameter indicative of a minimum initial inlet total pressure and a maximum parameter indicative of a maximum initial inlet total pressure.

13. The method of claim 1, wherein the computing device is part of a full-authority digital engine control (FADEC) system, wherein outputting the subsequent parameter as the inlet total air pressure includes outputting the inlet total air pressure to the FADEC system.

14. The method of claim 1, comprising:
determining the first parameter indicative of the first inlet total air pressure at the air inlet while the aircraft engine is grounded, the first inlet total air pressure being a first estimate of the inlet total air pressure;
executing the sequence while the aircraft engine is grounded; and
executing the at least one additional instance of the sequence while the aircraft engine is grounded to obtain the inlet total air pressure of the grounded aircraft engine.

15. The method of claim 1, comprising:
determining the first parameter indicative of the first inlet total air pressure at the air inlet while the aircraft engine is airborne, the first inlet total air pressure equal to the subsequent parameter obtained from a previous instance of the sequence;
executing the sequence while the aircraft engine is airborne; and
executing the at least one additional instance of the sequence while the aircraft engine is airborne to obtain the inlet total air pressure of the airborne aircraft engine.

* * * * *